United States Patent
Robinson et al.

(10) Patent No.: US 8,766,890 B2
(45) Date of Patent: Jul. 1, 2014

(54) CROSSTALK SUPPRESSION IN TIME SEQUENTIAL LIQUID CRYSTAL STEREOSCOPIC DISPLAY SYSTEMS

(75) Inventors: Michael G. Robinson, Boulder, CO (US); Douglas J. McKnight, Louisville, CO (US)

(73) Assignee: RealD Inc., Beverly Hills, CA (US)

(*) Notice: Subject to any disclaimer, the term of this patent is extended or adjusted under 35 U.S.C. 154(b) by 584 days.

(21) Appl. No.: 12/985,250

(22) Filed: Jan. 5, 2011

(65) Prior Publication Data

US 2011/0164194 A1 Jul. 7, 2011

Related U.S. Application Data

(60) Provisional application No. 61/292,466, filed on Jan. 5, 2010.

(51) Int. Cl.
*G09G 3/36* (2006.01)

(52) U.S. Cl.
USPC .................................. 345/87; 345/7; 345/102

(58) Field of Classification Search
USPC .......... 345/7–9, 102, 690, 87–88; 348/42, 51, 348/57, E13.001
See application file for complete search history.

(56) References Cited

U.S. PATENT DOCUMENTS

| 4,821,341 A | 4/1989 | Baptiste |
| 5,920,298 A | 7/1999 | McKnight |
| 6,046,716 A | 4/2000 | McKnight |
| 6,078,303 A | 6/2000 | McKnight |
| 6,104,367 A | 8/2000 | McKnight |
| 6,144,353 A | 11/2000 | McKnight |
| 6,225,979 B1* | 5/2001 | Taima et al. .................. 345/157 |

(Continued)

FOREIGN PATENT DOCUMENTS

| KR | 10-2007-0073807 A | 7/2007 |
| KR | 10-2009-0018528 A | 2/2009 |
| WO | 2009069026 A2 | 6/2009 |

OTHER PUBLICATIONS

A.J. Woods, et al. "Characterising Sources of Ghosting in Time-Sequential Stereoscopic Video Displays" Proceedings of SPIE vol. 4660, pp. 66-77 (XP008021168) 2002.

(Continued)

*Primary Examiner* — Kimnhung Nguyen
(74) *Attorney, Agent, or Firm* — Neil G. J. Mothew; Darlene K. Kondo (57) ABSTRACT

This disclosure primarily concerns 3D stereoscopic displays that provide alternately polarized left and right eye images encoded with a modulating LC polarization control panel (PCP) attached to the front of the display. Viewers then wear polarization analyzing eyewear to correctly see the different images. More specifically, the disclosure introduces global LC electrical reset during the addressing of liquid crystal time-sequential stereoscopic displays in order to reduce left/right eye contamination. LC materials in general do not respond fast enough with conventional addressing schemes to provide independent left and right eye images at the desired flicker-free, rate of sixty frames per second per eye. This disclosure and its embodiments may overcome this limitation, and also may address motion blur limitations, by driving pixels to a common LC state as part of the addressing cycle.

20 Claims, 11 Drawing Sheets

(56) References Cited

U.S. PATENT DOCUMENTS

| | | | |
|---|---|---|---|
| 6,304,239 | B1 | 10/2001 | McKnight |
| 6,329,971 | B2 | 12/2001 | McKnight |
| 6,975,345 | B1 | 12/2005 | Lipton et al. |
| 8,233,034 | B2 * | 7/2012 | Sharp et al. .................. 348/51 |
| 2007/0035494 | A1 | 2/2007 | Chang |
| 2007/0035672 | A1 | 2/2007 | Shestak et al. |
| 2007/0188711 | A1 * | 8/2007 | Sharp et al. .................. 353/8 |
| 2008/0198218 | A1 * | 8/2008 | Liu et al. .................. 348/43 |
| 2008/0316303 | A1 | 12/2008 | Chiu et al. |
| 2009/0263007 | A1 * | 10/2009 | Kitaura et al. .............. 382/154 |
| 2011/0063332 | A1 * | 3/2011 | Liao et al. .................. 345/690 |

OTHER PUBLICATIONS

Extended European Search Report dated Apr. 25, 2013 of European Patent Application No. 11732109.1.

Nvidia 3D Vision website, "3D starts here!", http://www.nvidia.com/object/3D_Vision_Overview.html; Nvidia Corporation (2010).

Co-owned, co-pending U.S. Appl. No. 12/853,265 to Robinson.

Jung et al., "Late-News Paper: A novel Polarizer Glasses-type 3D Displays with an Active Retarder", SID Symposium Digest of Technical Papers; vol. 40, Issue 1, pp. 348-351 (Jun. 2009).

Co-owned, co-pending U.S. Appl. No. 12/853,274 to Robinson.

International search report and written opinion of international searching authority in PCT/US2011/020277 dated Feb. 27, 2013.

* cited by examiner

CROSSTALK SUPPRESSION IN TIME SEQUENTIAL LIQUID CRYSTAL STEREOSCOPIC DISPLAY SYSTEMS

CROSS-REFERENCE TO RELATED APPLICATIONS

This application claims priority to U.S. Provisional Patent Application Ser. No. 61/292,466, filed Jan. 5, 2010, entitled "Crosstalk suppression in time sequential liquid crystal stereoscopic display systems," the entirety of which is herein incorporated by reference.

TECHNICAL FIELD

This disclosure generally relates to direct view stereoscopic displays, and, more specifically, this disclosure relates to direct view 3D stereoscopic displays that provide alternately polarized left and right eye images encoded with a modulating liquid crystal (LC) panel and polarization control panel (PCP) on the front of the display.

BACKGROUND

Stereoscopic displays are seeing a revival following the success of 3D cinematic productions. Technology has played its part in making what used to be an uncomfortable experience into enjoyable and desirable entertainment.

Cinematic display technology is primarily polarization encoded projection of time-sequential left and right eye images. Alternate images are flashed onto a screen through a liquid crystal modulating element that imparts near orthogonal circularly polarized states onto the projected light. Reflection from a 'silver' screen preserves polarization so that viewers that don appropriate analyzing eyewear see only those images destined for correct eyes. The difference between left and right eye images produces stereoscopic disparity which is naturally interpreted by a user as depth.

An extension of this technology is to apply it to TVs in the home enabling 3D in the living room. Unfortunately, the response time used by time sequential 3D is at odds with the dominant display technology, particularly in liquid crystal display (LCD) based displays. Extending the cinema approach to high-quality stereoscopic TV is therefore difficult because it means being able to display alternate images at high frame rate without noticeable frame to frame mixing and motion blur.

SUMMARY

Methods for crosstalk suppression in a liquid crystal stereoscopic display system are provided. The methods include, after displaying a first eye image, stopping light to a viewer for a dark period. During the dark period, data is written sequentially on a liquid crystal (LC) panel and a reset pulse is applied to an electrode on the LC panel after the last line is written. The methods also include allowing light to the viewer after the reset pulse is applied for a viewing period.

According to an aspect, the dark period may include turning off a backlight, while the viewing period may include turning on the backlight.

According to another aspect, the dark period and viewing period may include synchronizing with shutter glasses blocking or allowing light to a viewer.

According to another aspect, the data may be written sequentially from top to bottom lines of the LC panel. Voltages may be applied to bottom electrodes corresponding to pixels of the LC panel and the reset pulse may be applied to a top electrode on the LC panel.

According to another aspect, during the dark period, substantially all pixels in the LC panel are globally reset to a common LC state. The common LC state may be a common dark state. A second eye image may be displayed.

According to another aspect, during the dark period, a polarization converting panel may be switched between a first-eye and a second-eye polarization mode.

These and other advantages of the present disclosure will become apparent to those skilled in the art from the following detailed description, the accompanying drawings, and the appended claims.

DETAILED DESCRIPTION

Generally, the disclosed approaches work by driving an LC quickly to a common state between frames, effectively erasing previous frame data and providing a common starting point for addressing next frame data. Appropriate common states may be those that are driven by high applied voltages. Common states may be reached in sub-milliseconds regardless of the LC's previous state. LC modes that drive to black (i.e., normally white) are particularly well-suited as they provide high-contrast, low-crosstalk stereoscopic images. For this reason, the embodiments discussed include, for example, normally white twisted nematic (TN) LC panels. Note, however, that the general concept may be applied according to the principles disclosed herein to other LC modes where the common driven state might be other than black.

The disclosed approaches assume conventional thin-film transistor (TFT) addressing of transmissive LCD panels, where images are updated through line-by-line deposition of charge onto local capacitors—one for each pixel. This charge imparts a voltage onto a transmitting indium tin oxide (ITO) electrode that acts to alter the LC state and its modulation properties. The time taken to deposit charge can be much faster than the response of the liquid crystal, which may result in incorrect specification of panel frame update rates. Currently-advertised 240 Hz LCD panels do not possess the capability yet of providing 240 viewable, independent frames per second. Furthermore, the effect of line-by-line addressing provides a scrolling update, where next frames appear to 'grow' from the top to the bottom of the display. Between the current and next frame is a moving region of intermediate display data whose size is dependent on both the address rate and the response of the LC. For fast TN LC panels addressed at 120 Hz, this intermediate region can be ~25% of the display area. The display of intermediate information is cause for large crosstalk in time-sequenced stereoscopic LC displays, as witnessed by the recent Nvidia active eyewear shutter-glass solution (See http://www.nvidia.com/object/3D_Vision_Overview.html). Indeed, the Nvidia active eyewear shutter-glass solution has its drawbacks, including high cross-talk toward the bottom of the screen due to viewing the mixed data during the period toward the end of the addressing cycle.

There have been several approaches to overcoming the problems of scrolling mixed displayed data. Some approaches use segmented, scrolling polarization control panels (PCPs) and/or scrolling illumination, as discussed below.

This disclosure relates to avoiding viewing mixed data (i.e., crosstalk of left and right eye images) through a common reset of the LC state between viewable periods. This disclosure also relates to solving the problem of motion blur that typically occurs with LC panels by virtue of flashing the backlight at a low duty cycle.

At least two approaches are provided by this disclosure. One approach employs driving the common transparent ITO electrode deposited on the top substrate of the LC panel. This same substrate (or top-plate) contains the red, green, and blue color filter array (CFA) and the surrounding black matrix masking. Applying a voltage to this electrode drives the LC material to a common driven state independent of the addressed data value (i.e., charge on the local pixel capacitors). Some embodiments use this effect to accomplish the desired common reset. A second related approach drives the LC to a common state through modified TFT addressing exclusive of top-plate driving.

U.S. Pat. No. 4,281,341, (herein incorporated by reference) relates to the basic overall system concept of a display and liquid crystal modulator. It includes embodiments with scrolling polarization control panels. Commonly-owned U.S. Pat. No. 6,975,345 (herein incorporated by reference) relates to segmented pi-cells, includes methods to suppress boundary visibility, and is complementary to the systems disclosed herein. More recently, commonly-owned U.S. Patent Pub. No. 2008/0316303 includes teachings that encompass controlling the back light illuminator, while commonly-owned patent application Ser. No. 12/853,265 includes teachings that encompass altering the rate and/or intermittency of the line-by-line addressing scheme (both herein incorporated by reference).

The resurgent interest in 3D has also spurred some recent published material describing PCP LCD systems, for instance, as published in article LG Display Co., SID '09 DIGEST, pp. 348-351. A demonstration unit based on the LG-disclosed technology was also on show at the SID '09 conference.

General details concerning these teachings and how they relate to the present disclosure are discussed in the next section. One example of how the presently disclosed approach is distinct from the above teachings is that it involves driving the LC to a common state between displaying alternate left and right eye image data.

Some aspects of the present disclosure include top-plate voltage driving and double-line addressing. Unlike the approaches discussed in a series of U.S. patents, U.S. Pat. Nos. 5,920,298; 6,046,716; 6,078,303; 6,104,367; 6,144,353; 6,304,239; and 6,329,971 (hereinafter "'298 family") (herein incorporated by reference), aspects of this disclosure relate to a top-plate drive approach for solving problems recognized herein relating to stereoscopic displays. More specifically, the present disclosure recognizes that existing TFT panels do not provide sufficient local pixel capacitance above and beyond that of the parallel electrode structure that sandwiches the LC material. As such, top-plate driving grossly affects the fidelity of conventional addressing because a top-plate voltage is applied during interrupted periods of addressing. In contrast, the teachings of the '298 family imply coincident address and hold with applied top plate voltage. Moreover, the present disclosure relates to top plate modulating schemes in which mixed data is displayed for a period prior to reset when a second displayed data is displayed solely and viewed. This is a consequence of adhering to conventional TFT panels and their line-by-line addressing which is not discussed in prior art approaches. In contrast, all patents in the '298 family claim a sequence of displayed data. According to the teachings of the '298 family, first an image is shown associated with one set of data. A resetting/holding voltage is then applied to the top-plate after which a new image associated with new data is displayed. In short, the '298 family describes top-plate driving in a general sense including sequential frame independence, but does not solve the problems recognized herein relating to stereoscopic displays nor discuss the above-mentioned approaches relating to addressing and mixed data display.

The presently-disclosed second approach relies on addressing lines to a common state (typically black) prior to being addressed with new data. Unlike the concepts disclosed in commonly-owned U.S. patent application Ser. No. 12/853, 274, which relate to the concept of addressing alternate frames to black, the presently-disclosed prior black frame insertion approach uses a data period different from a frame period between driving a pixel to its correct value from when it is driven to black. In some embodiments, conventional panels can be addressed twice within a frame time, and having non-adjacent sequential row addressing, may use a modification to the row-enable driver circuitry.

Figure 1:
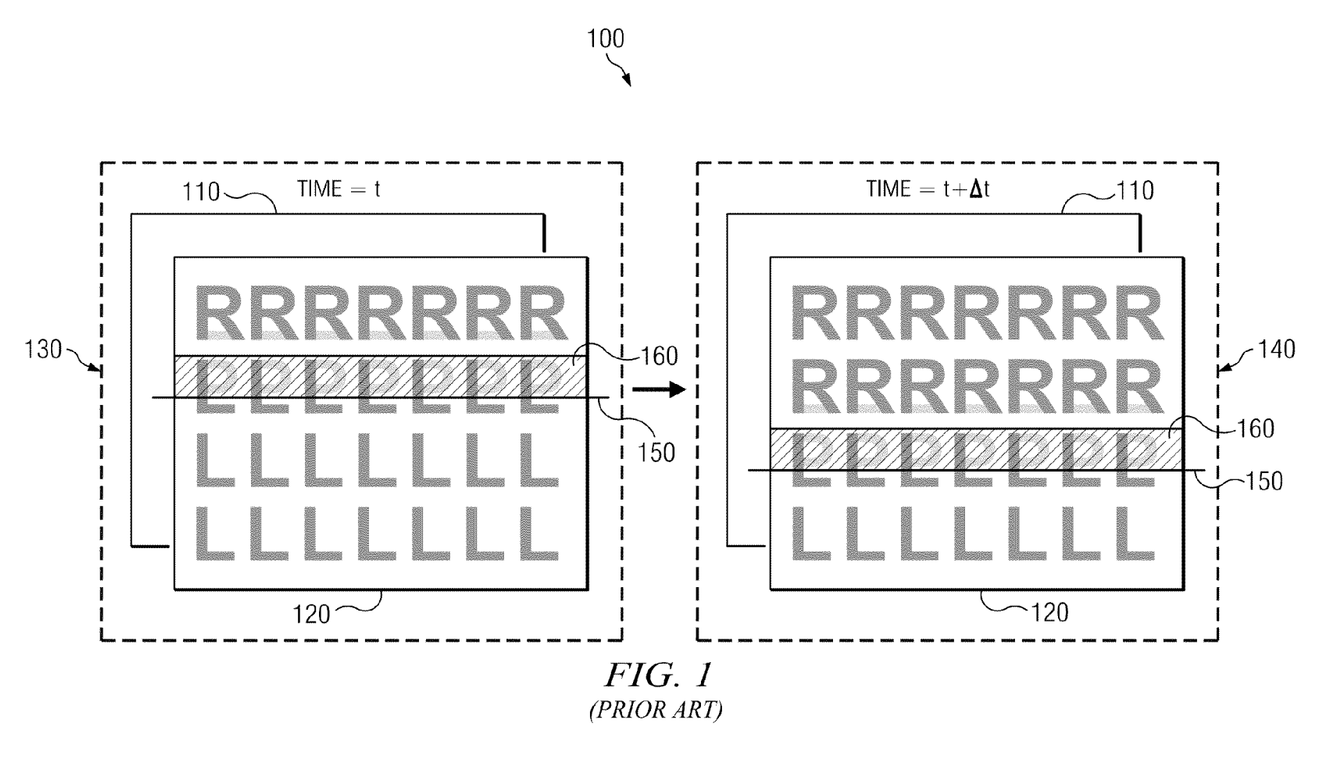
FIG. 1 is a schematic diagram illustrating the operation of a continuously backlit LCD panel.

FIG. 1 is a schematic diagram illustrating the operation of a conventional display 100 having a continuously backlit LCD panel. The conventional display 100 typically includes a continuously lit back light unit (BLU) 110 and a liquid crystal modulating panel 120.

In FIG. 1, two snapshots 130, 140 are shown side by side, separated in time by a fraction of a frame update period. The first snapshot 130 shows operation at a time=t, and the second snapshot 140 shows operation at a time=t+Δt. In operation, update of an LCD is carried out line-by-line, shown by update line 150. At any given time, a voltage is applied to a single row electrode, which enables pixel based thin-film transistor (TFT) elements along that row to direct current from data columns onto local storage capacitors. The desired data current is applied in parallel prior to disabling the row's TFTs through application of a second row voltage. The next row is then addressed in a similar fashion leaving behind the LC material to respond to the newly applied voltage. Gradually, as more and more lines are addressed, the LC material settles into a state determined by the deposited charge. This results in a scrolling update, where the line addressed at any given time leads a finite mixed imagery region 160 above it in its wake. This is shown schematically in FIG. 1, illustrating the addressing of a LCD display.

A back light unit 110 continuously illuminates a modulating LCD panel 120, whose display is updated using a line-by-line addressing scheme. The modest liquid crystal response time results in a gradual transition from one image to the next depicted here by a series of Rs and Ls for alternate right and left eye images respectively. FIG. 1 shows two time-delayed schematic snapshots 130, 140 of a typical system where the scrolling update reveals the LC transition as a mixed region 160 above the address line 150.

Optimally, the address time is maximized so current conventional 2D panels do not pause significantly between completing the addressing of a first frame and the beginning of the next. As a result, at no time is there a complete image corresponding to a single frame. Sequential stereoscopic viewing of independent left and right eye images is therefore not viable with conventional LCDs.

Figure 2:
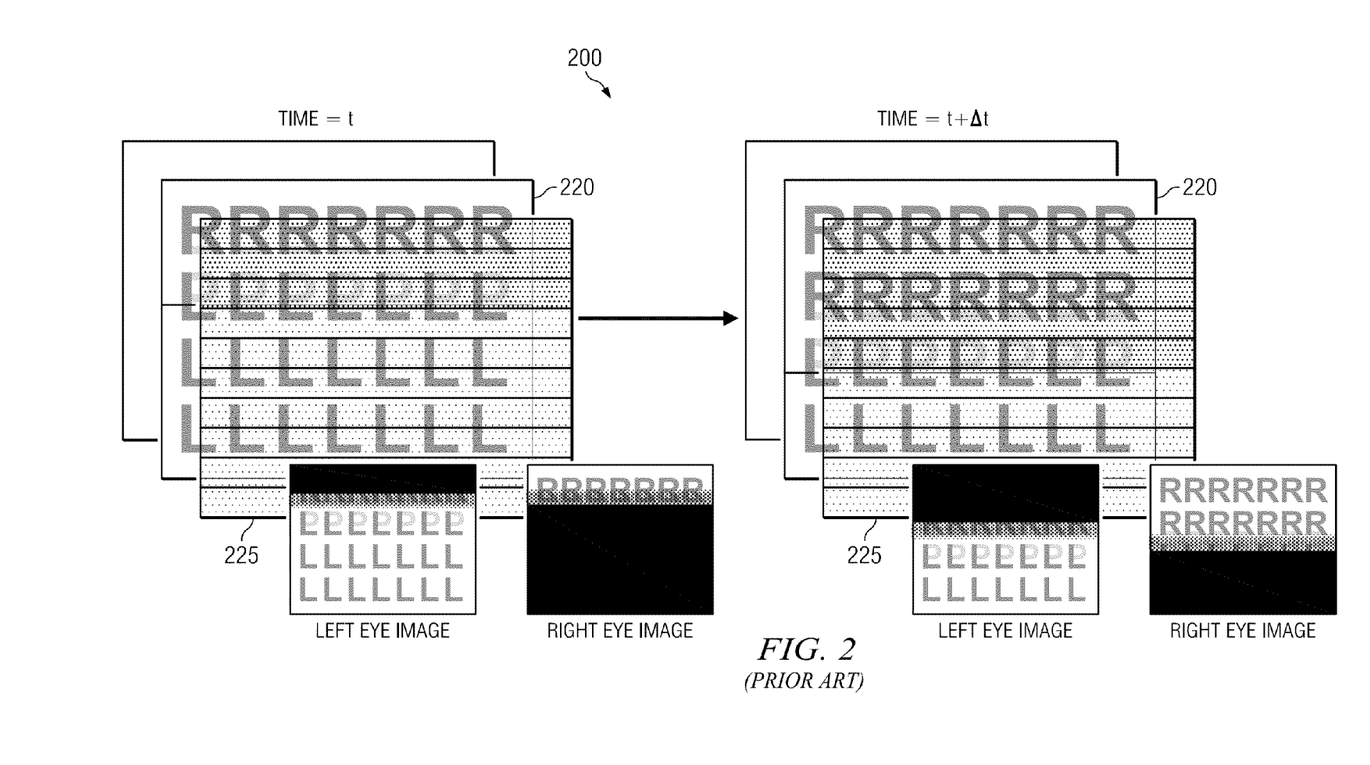
FIG. 2 is a schematic diagram illustrating the operation of a backlit LCD panel, employing a segmented polarization control element.

FIG. 2 is a schematic diagram 200 illustrating the operation of a known continuously backlit LCD panel 220, employing a segmented polarization control panel 225. Such approaches are described in commonly-owned U.S. patent application Ser. No. 12/853,265 and U.S. Pat. Pub. No. 2008/0316303 (both herein incorporated-by-reference) and overcome the problem outlined in the description of FIG. 1 to a considerable extent by using scrolling a segmented PCP 225. Synchronizing the driving of each segment of the PCP 225 with the panel 220 addressing effectively splits the mixed imagery present on the display at any instant between the eyes. In this manner, right/left eye image admixture (crosstalk) of less than 2% is possible with commercially-available fast TN panels and with a fast pi-cell based PCP having at least 10 segments.

Figure 3:
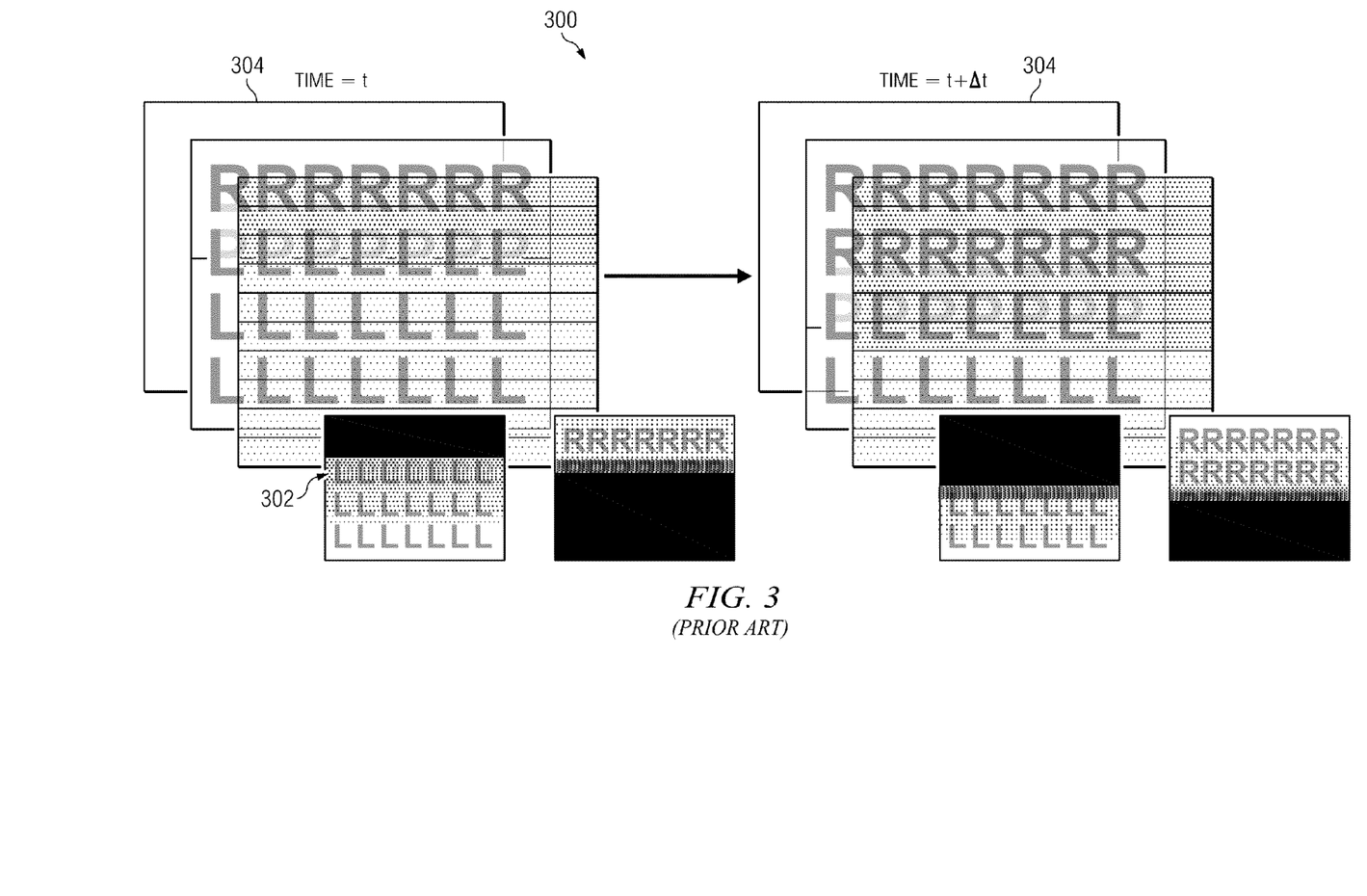
FIG. 3 is a schematic diagram illustrating the operation of a scrolling backlight LCD panel.

FIG. 3 is a schematic diagram 300 illustrating the operation of a known scrolling backlight LCD panel. Implementing a scrolling back light unit (BLU) 304 further reduces the crosstalk described above with reference to FIG. 2, suppressing the visibility of undesired mixed imagery. A scrolling BLU 304 is becoming very feasible with the advent of local dimming LED illumination, as taught in commonly-owned U.S. Patent Pub. No. 2008/0316303.

Figure 4:
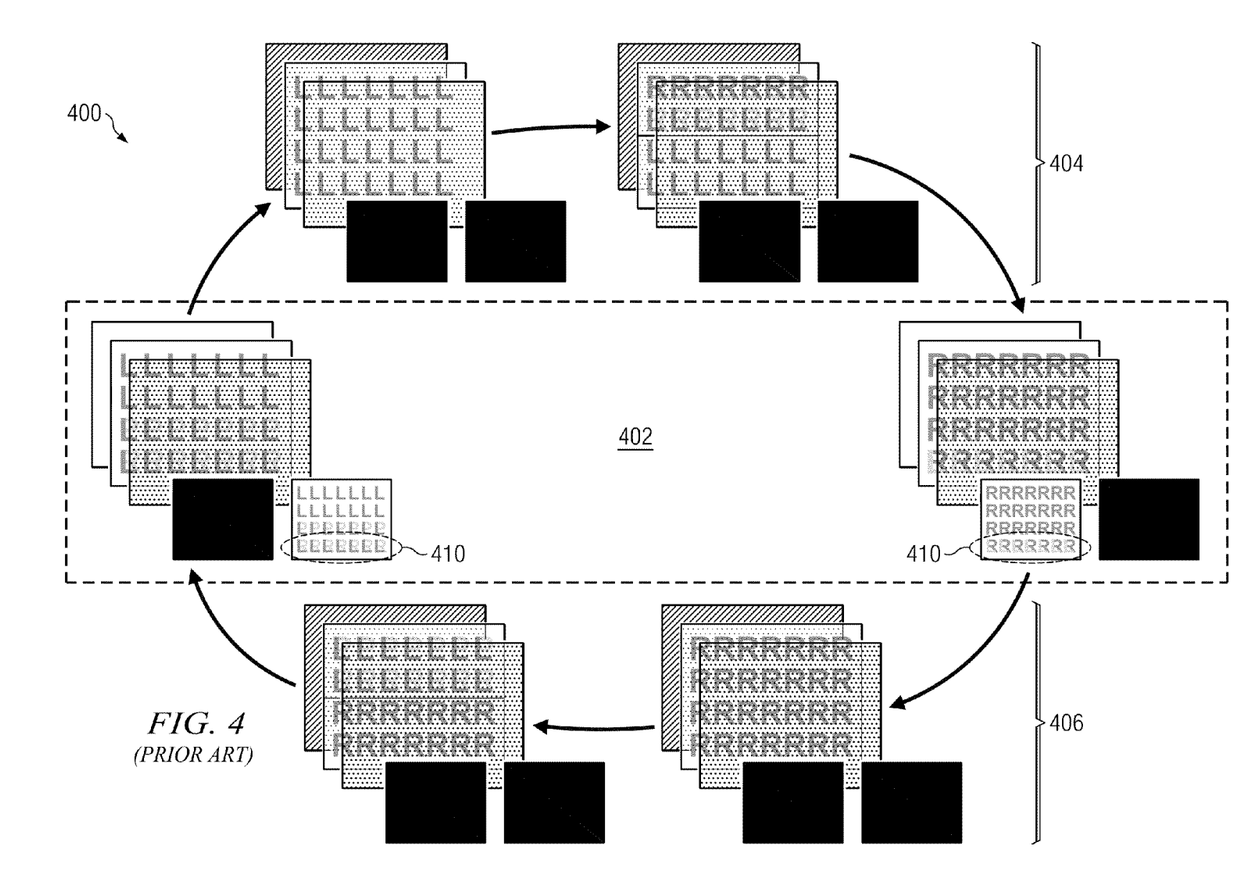
FIG. 4 is a schematic diagram illustrating the operation of a LCD panel system in which the back light unit is modulated globally to display images during periods where the line-by-line addressing is interrupted between complete frame addressed cycles.

FIG. 4 is a schematic diagram illustrating the operation of a known LCD panel system 400 in which the back light unit is modulated globally to display images only during periods 402 where the line-by-line addressing is interrupted between complete frame addressed cycle, as taught in commonly-owned U.S. patent application Ser. No. 12/853,274, herein incorporated by reference. The back light unit is turned off during periods 404, 406 when the panel is addressed and the PCP is switched.

An alternative technique of reducing crosstalk without using a segmented PCP is similar to how shutter glass systems operate. Developed recently by Nvidia, this approach addresses each line faster than that required for continuous update (see http://www.nvidia.com/object/3D_Vision_Overview.html). This allows the addressing to cease for a period following update of a single frame. During this pause period, the transitioning LC has time to settle before further lines are addressed. If a sufficient pause period is introduced, the LC will have sufficient time to display a single image for viewing though active eyewear lenses. This same approach may be implemented in a panel-based LC PCP in conjunction with modulated illumination. Turning the BLU off is equivalent to making both lenses of an active eyewear unit opaque and hides the mixed imagery that exists during addressing. To view a settled (or, more realistically, a settling) LC image, the BLU is turned on with a correctly switched PCP.

Residual crosstalk at the bottom of the image may be traded against display brightness by adjusting the viewing period start time. In both the scrolling and globally-modulated prior art systems, not displaying mixed imagery substantially prevents crosstalk, which is one of the key features of the present disclosure.

A first aspect of the present disclosure is to avoid mixed imagery by applying a reset pulse to the top plate of an LCD in order to globally reset pixels to a common LC state between sequential images.

Figure 5:
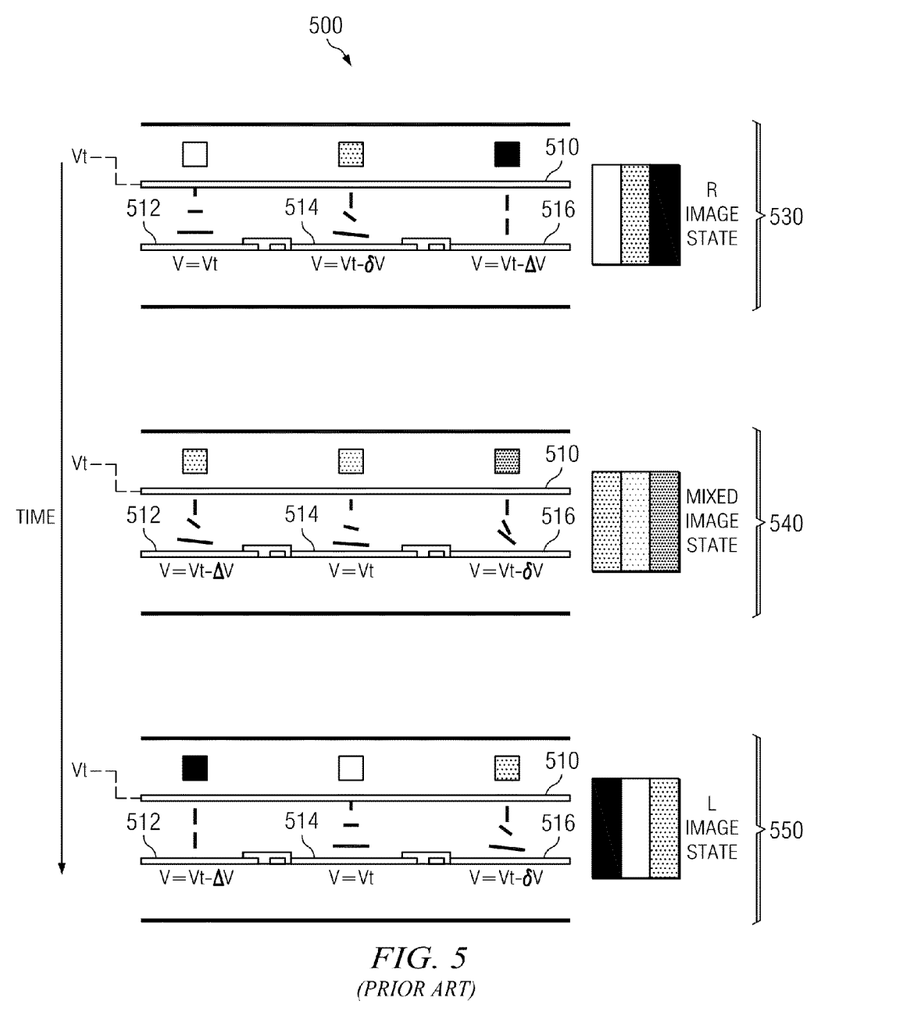
FIG. 5 is a schematic diagram illustrating a cross section of a liquid crystal display during the transition time between alternate images.
Figure 6:
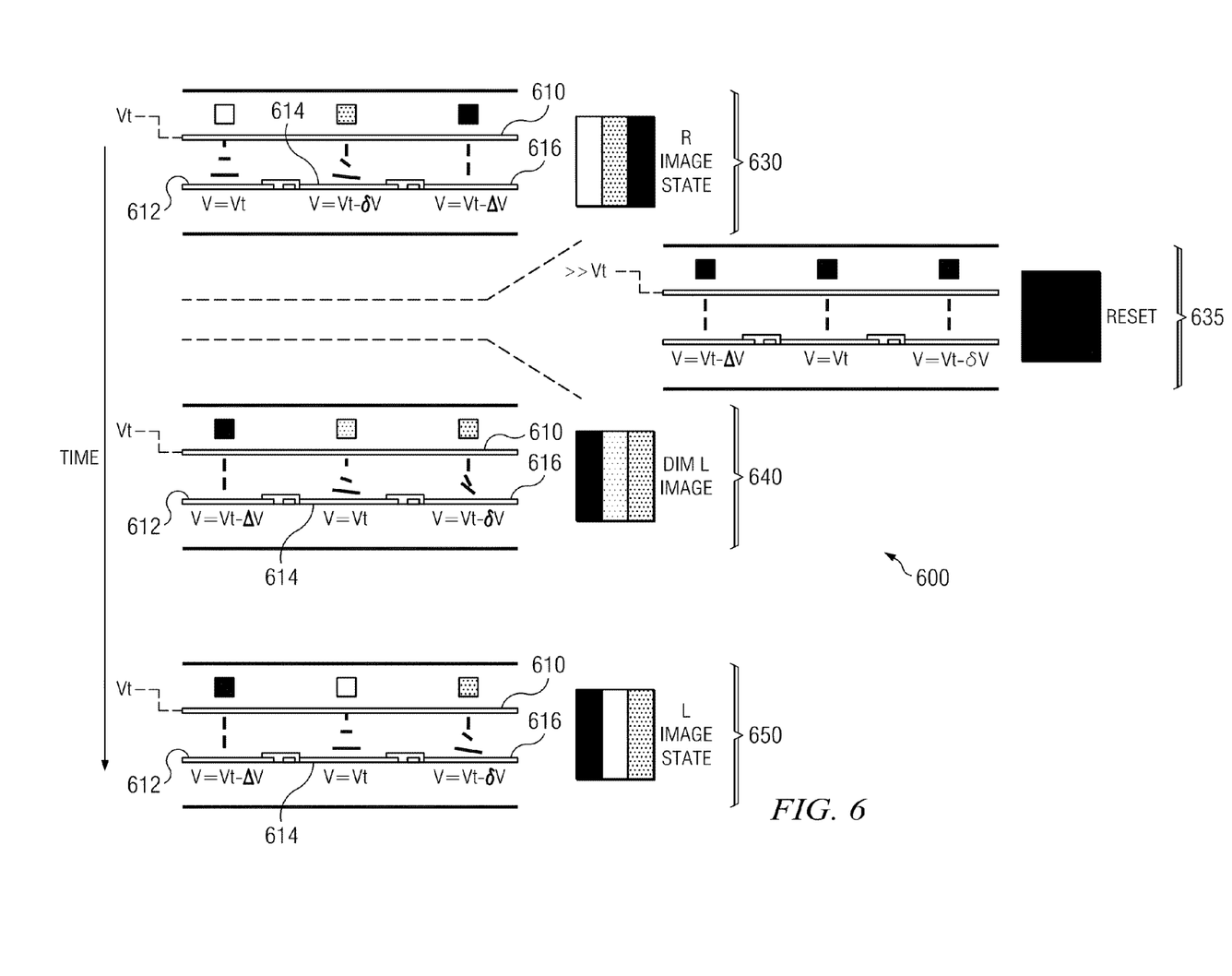
FIG. 6 is a schematic diagram illustrating a cross section of a liquid crystal display during the transition time between alternate images, in accordance with the present disclosure.

FIG. 5 and FIG. 6 show the displayed imagery of three adjacent row pixels as a function of time during addressing. The figures represent a horizontal cross section of a LCD panel at three different time periods.

FIG. 5 is a schematic diagram illustrating a cross section of a liquid crystal display 500 during the transition time between alternate images, for a conventional system. Here, in operation, switching the liquid crystal is accomplished as a result of the electric field imparted across the LC between plates 510 on the top and plates 512, 514, 516 on the bottom. This is adjusted from frame to frame by the application of a voltage (V) onto bottom transparent pixel electrodes 512, 514, 516. The top electrode 510 common to all pixels remains at a constant voltage (Vt). For instance, in the Right (R) image state 530, V=Vt is applied to a first bottom plate 512, V=Vt−δV is applied to a second bottom plate 514, and V=Vt−Δt is applied to a third bottom plate 516. As shown in FIG. 5, the finite response time of the LC results in mixed imagery (illustrated in the mixed image state 540) in the transition from the Right (R) image state 530 to the Left (L) image state 550. To get to the Left (L) image state 550, V=Vt−Δt is applied to the first bottom plate 512, V=Vt is applied to the second bottom plate 514, and V=Vt−δV is applied to the third bottom plate 516. In this example, the intensity order (middle row 540) is neither that of the previous (top row 530) nor the addressed state (bottom row 550). Here, the LC responds to the applied voltage in a finite time, during which the pixels display incorrect relative intensities to that of the desired next image.

FIG. 6 is a schematic diagram illustrating a cross section of a liquid crystal display 600 during the transition time between alternate right and left images, in accordance with the present disclosure. FIG. 6 illustrates the introduction of a short reset voltage applied to the top electrode just following pixel addressing.

Here, in operation, switching the liquid crystal is accomplished as a result of the electric field imparted across the LC between plates 610 on the top and plates 612, 614, 616 on the bottom. This is adjusted from frame to frame by the application of a voltage (V) onto bottom transparent pixel electrodes 612, 614, 616. The top electrode 610, common to all pixels, remains at a constant voltage (Vt). For instance, in the Right (R) image state 630, V=Vt is applied to a first bottom plate 612, V=Vt−δV is applied to a second bottom plate 614, and V=Vt−Δt is applied to a third bottom plate 616.

Next, in a reset state 635, the pixels are driven to a common state (assumed black here, although it could be any other common state in other embodiments), enabling them to globally relax into the desired state without mixing and suppressing any unwanted intensity reversal.

After the reset state 635 is applied, the Left (L) image state 650 may be achieved by applying, for instance, V=Vt−Δt to the first bottom plate 612, V=Vt to the second bottom plate 614, and V=Vt−δV to the third bottom plate 616. After the reset state 635, in the transition from the R image state 630 to the L image state 650, a dim L image can be seen at 640. Thus, in accordance with the present disclosure, applying a short reset voltage to the top electrode 610 after addressing resets the LC, allowing settling into the desired state with correct relative intensities. This means the overall intensity is slightly affected, but the desired image is nevertheless viewable with minimal stereoscopic crosstalk.

Figure 7:
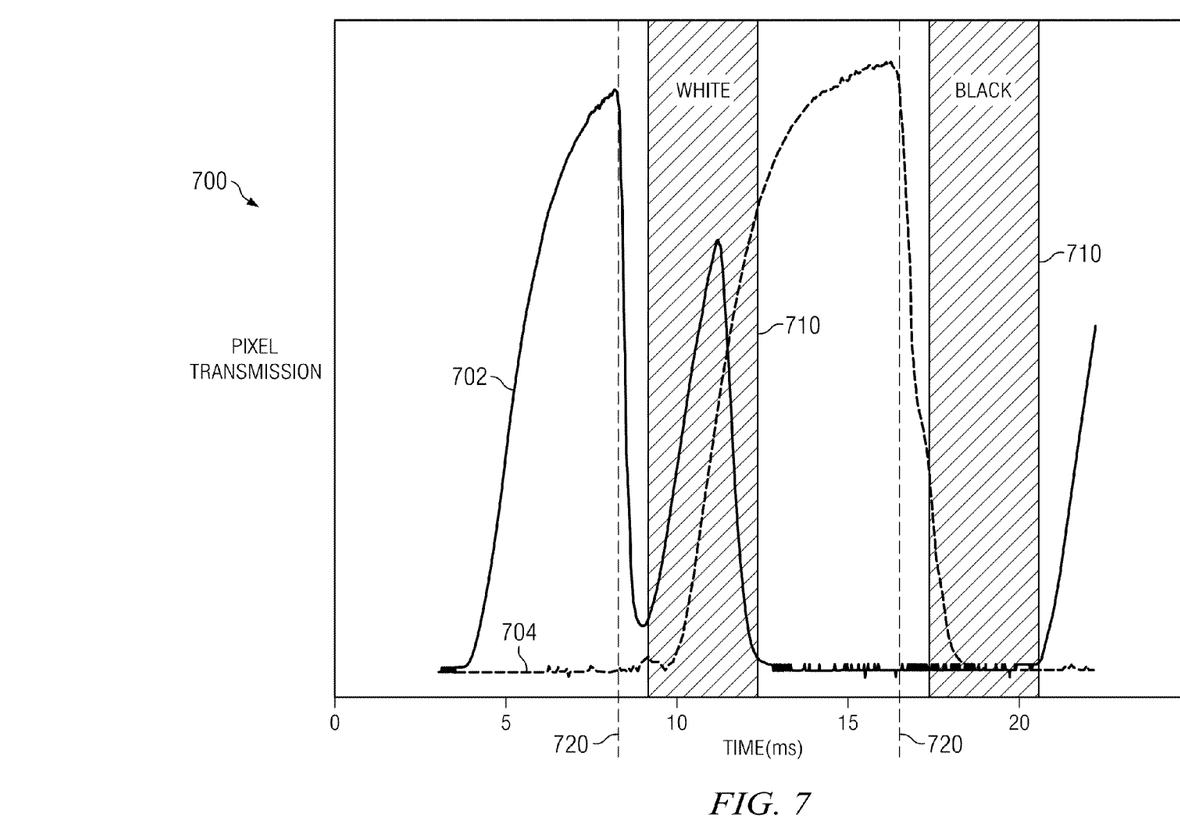
FIG. 7 is a graph of pixel transmission of a twisted nematic (TN) LCD as a function of time, in accordance with the present disclosure.

FIG. 7 is a graph 700 of pixel transmission of a TN LCD as a function of time. In accordance with the present disclosure, the two traces are from top 702 and bottom 704 line pixels. In this exemplary embodiment, alternate white and black frames are written to the display at 120 Hz with a single frame addressed in approximately 6 ms. The addressing is paused for the remaining approximately 2.5 ms. A Vsync pulse 720 is detected when the last line is addressed and precedes the viewing period where addressing is paused. The Vsync triggers a 15V, 0.1 ms pulse 720 which is applied to the panel's top plate to reset the LC to a near global dark state. This is shown by the almost equally low transmission of both top and bottom pixels at approximately 1 ms delay from the vsync. Viewing the display (e.g., BLU switched on) in the shaded window periods 710 provides image isolation and stereoscopic low crosstalk.

Graph 700 shows actual measured transmission from pixels in both the top and bottom rows of a TN panel during 120 Hz interrupted addressing of alternate full black and white images. At every Vsync instant, a 15V, 0.1 ms pulse 720 is driven to the panel's top plate which forces the normally white TN LC of all pixels into a near common low transmitting, substantially black state. Whatever charge was deposited at the pixels during addressing remains unchanged resulting in a relaxation to the desired addressed state near independent of when the pixel was addressed. The slight temporal offset of top and bottom lines due to the time difference between addressing is almost entirely negated by the similar offset used to achieve the next LC state. Graph 700 confirms the viability of a top plate reset scheme. The same experiment also showed that applying a top-plate drive voltage while addressing may result in insufficient local capacitance. Maintaining a high voltage during addressing resulted in unacceptable reverse contrast imagery. Although panels could be designed to avoid this, these findings illustrate that one implementation would be to drive the top plate following any addressing and to hide any mixed imagery through back light modulation. This time separation of addressing and top plate driving is an important distinction between this and prior art as discussed above.

A second aspect of this disclosure relates to driving pixels to a common state using the conventional line-by-line TFT drive techniques prior to correct addressing. In general, this approach results in a line being addressed twice during a frame update, which, in turn, uses two offset address lines to scroll down the panel. Conventional panel architecture does not allow this as it is deemed unnecessary. Fortunately, minor alteration to the row shift registers may be used to implement such a system.

The first aspect of the disclosure can be applied to systems employing both non-segmented and segmented PCPs whereas the second aspect uses a scrolling segmented approach, as described in the following section.

Figure 8A:
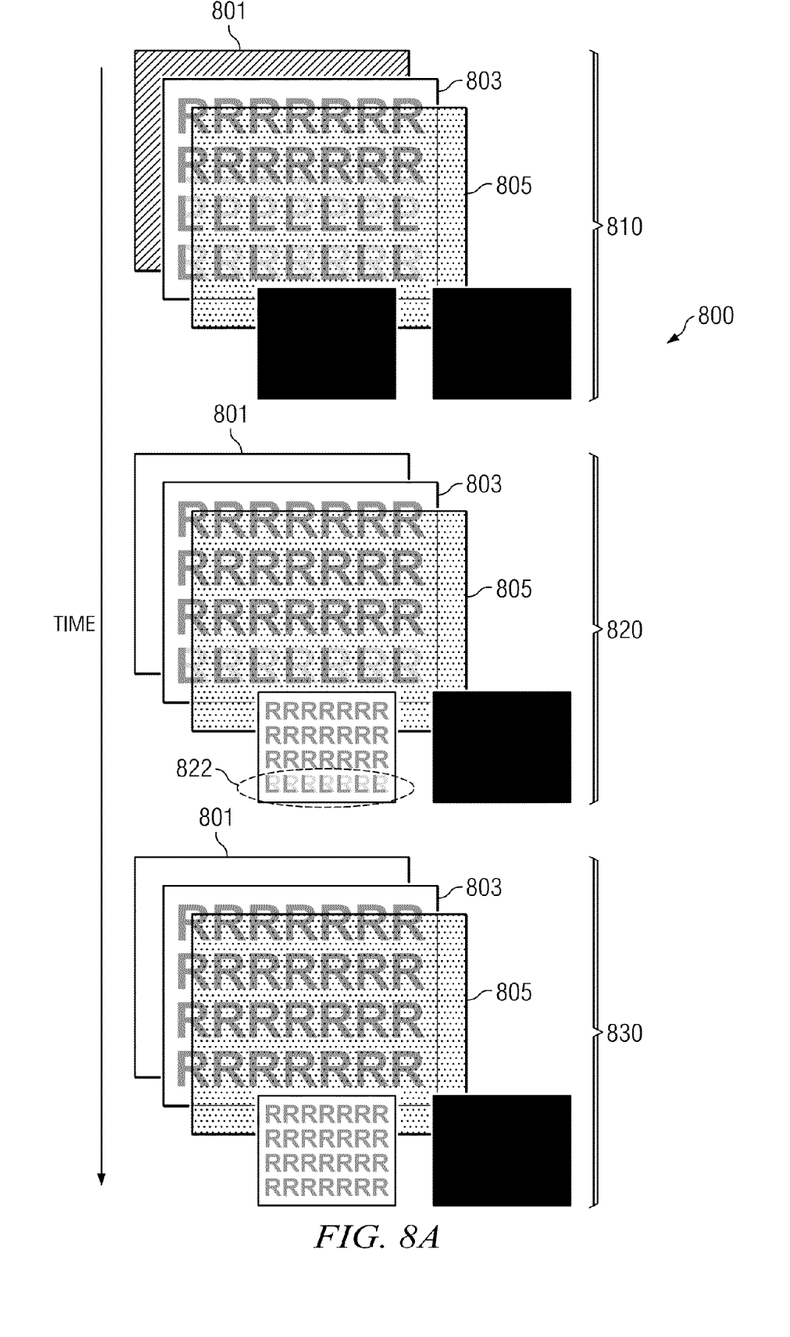
FIG. 8A is a schematic diagram illustrating the operation of an LC display system.
Figure 8B:
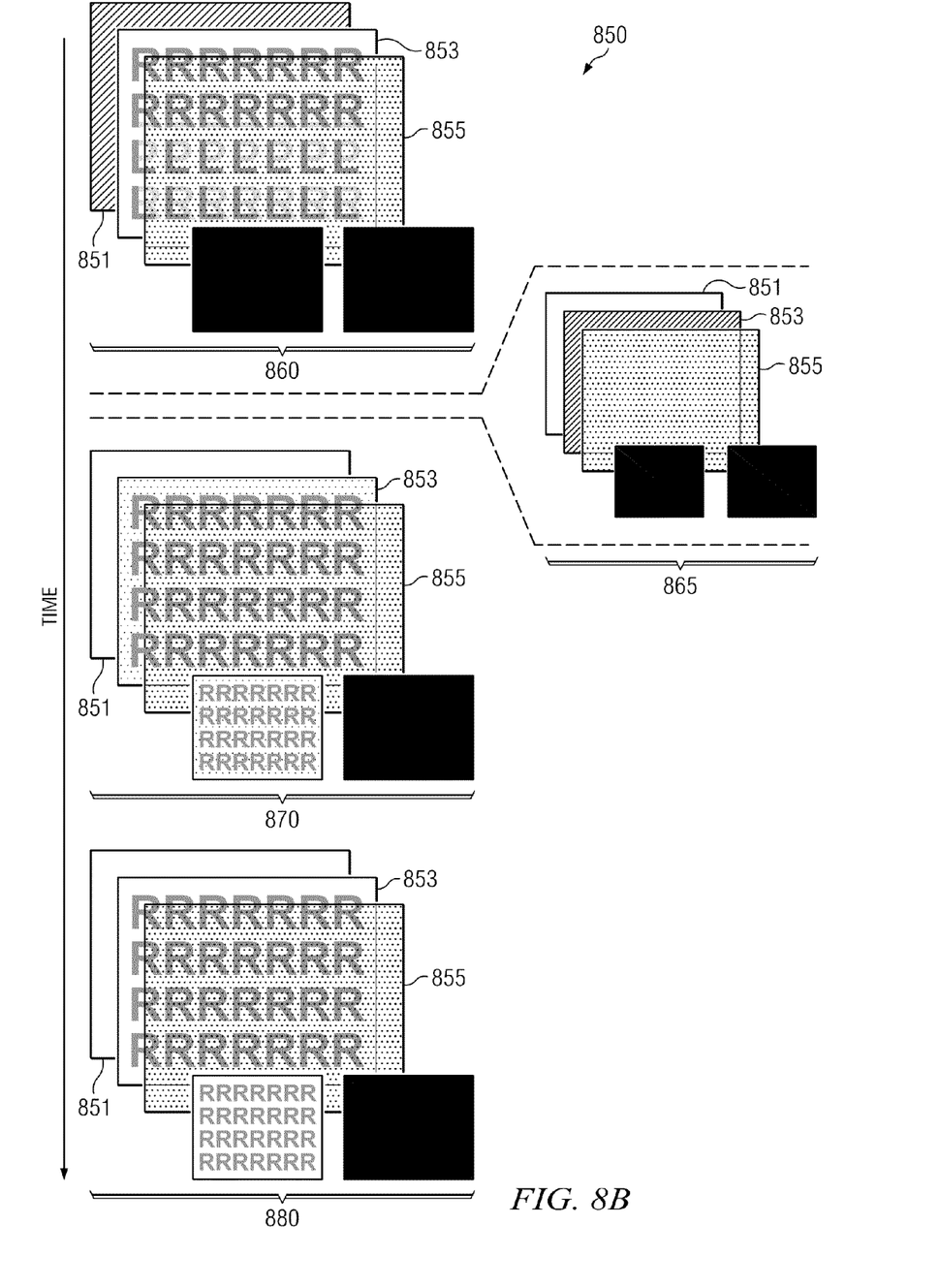
FIG. 8B is a schematic diagram illustrating the operation of an embodiment of an LC display system using global reset of the LC panel, in accordance with the present disclosure.

FIGS. 8A and 8B are schematic diagrams illustrating the operation of a conventional LC display system 800 against a disclosed embodiment of an LC display system 850 that uses global reset of the LCD panel. FIG. 8A illustrates a more conventional approach—void of top plate driving and without a reset. FIG. 8B illustrates a disclosed embodiment showing a reset 865.

In FIG. 8A, the LC display system 800 includes a switchable BLU 801, a uniform PCP 805, and a normally white (drive to black) LCD panel 803. While the LCD panel 803 is addressed from L to R image data (at 810), the BLU 801 is off, and any transitioning imagery, though displayed on the LCD panel 803, is not viewable. Thus the viewer sees nothing in both the right and left eyes. Once the LCD panel 803 has substantially transitioned to R image data (at 820), the BLU 801 is turned on, and the R imagery displayed on the LCD panel 803 is viewable. The PCP 805 is also synced with the LC display system 800, allowing for light to be viewed by a right eye of a user. As shown, the system 800 has mixed imagery (crosstalk) 822 corresponding to a settling region following the address line (see, e.g., FIG. 1). When the R imagery is substantially settled (at 830), the R image is displayed on the LC display system 800.

In contrast, the disclosed embodiments (e.g., as shown in FIG. 8B) avoid crosstalk and motion blur. In an embodiment, according to FIG. 8B, in operation, a global top plate driving scheme is applied in a system comprising a uniform, switchable BLU 851, a uniform PCP 855, and a normally white (drive to black) LCD panel 853. In an embodiment, the panel 853 is addressed at 120 Hz using interrupted addressing methods.

As shown by the subdiagram at the top right 860, the panel 853 is addressed line by line where the charge associated with a next image is deposited onto the local pixel capacitors. In an embodiment, the panel 853 is addressed line by line from top to bottom. In other embodiments, the panel 853 may be addressed in other ways including, but not limited to, bottom to top, middle to outer lines, etc. During the period 860, the BLU 851 is off and any transitioning imagery, while displayed, is not viewable, thus the viewer sees nothing in both the right and left eyes.

As shown by the second subdiagram 865, upon completing the frame update, addressing is paused and a high voltage pulse is applied for a short period of time to the top plate to drive the LC 853 globally to a substantially common dark state. In this stage 865, the BLU 851 may be turned on. In an embodiment, the high voltage pulse is applied after a last line of a frame is written. In other embodiments, the high voltage pulse is applied substantially simultaneously with the last pixel of the last line of the frame being written.

As shown by the third and fourth subdiagrams 870, 880, when the top plate is returned to its common voltage level, the BLU 851 is turned on and the gradually settling image becomes viewable without any significant contamination from the display's prior state. In an embodiment, after $\frac{1}{120}^{th}$ second elapses from when the panel addressing began, the BLU 851 is turned off and addressing of the next frame commences (e.g., back to the subdiagram 860, except this time, addressing of the left eye frame is performed on the LC instead of the right eye frame). The PCP 855 is switched during the period when the BLU 851 is off—effectively avoiding any crosstalk contribution from polarization mixing.

The application of top plate voltage would, ideally, be consistent with the DC balancing scheme. DC balancing may be used to avoid a net time average field to exist over the liquid crystal material which can cause ionic contaminants found within the LC material to migrate toward the substrate boundaries and can cause build up of a permanent cell voltage. Without DC balancing, it is very common to witness 'image sticking' where static images displayed for a long period of time remain visible regardless of later-displayed information. To prevent this phenomenon, the polarity of applied data voltages may be alternated between successive frames. Since this polarity is relative to the top plate voltage, a compatible top plate voltage reversal may be used to achieve equivalent DC balancing. This can be used for all disclosed embodiments.

In some embodiments, LCD addressing and illumination, as described above, is employed and used with active shutter glasses instead of employing a PCP and passive eyewear. The system is, effectively, viewable globally during the illumination period. This embodiment should yield improved crosstalk over incumbent LCD shutter glass systems, such as that taught by the above-referenced Nvidia shutter glass system.

In other embodiments, top plate electrode is segmented and scrolling methods are used. An LCD panel may be addressed as if comprised of separate display regions—each including a series of adjacent rows situated under a single horizontally striped top plate electrode. The display is effectively addressed with interrupted line-by-line addressing, where, at each interrupt, a voltage is applied to the top electrode above the previously addressed lines. Segments of a PCP may correspond to each of the display regions, being effectively aligned with the striped top plate electrodes (as would the elements of a segmented illuminator). Breaking the whole display into striped sections improves the duty cycle of the illumination and, hence, improves the overall brightness.

Figure 9:
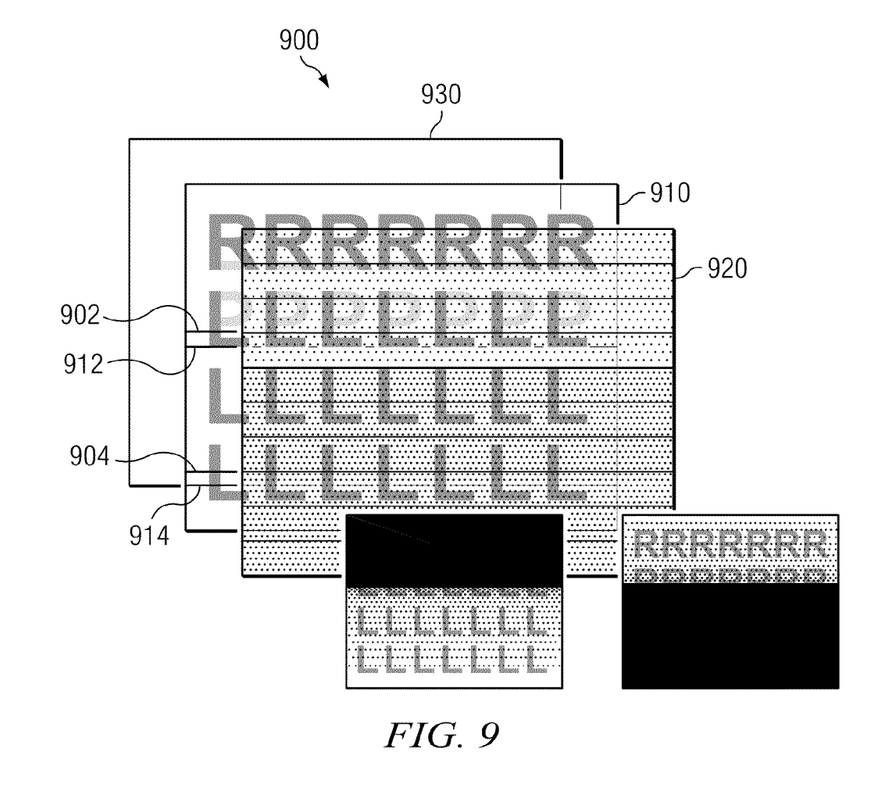
FIG. 9 is a schematic diagram of a system in which an LC display is reset to a common state through scrolled addressing, in accordance with the present disclosure.

FIG. 9 is a schematic diagram of an embodiment in which the LC display 900 is reset to a common state through dual-line scrolled addressing. In operation, a panel 910 is addressed from top to bottom, line by line starting with the column data set to a common high voltage. In other embodiments, the panel 910 may be addressed from bottom to top. Either way, corresponding PCP 912 segments are synced with the panel 910 addressing.

A first row of pixels 904 is addressed with uniform high-data column voltages that cause the LC 910 to drive to a common state (black for normally white TN panels). A second row of pixels 902, physically located above the first in the top to bottom embodiment, is then enabled allowing correct data voltages to charge pixel capacitors. This row 902 is separated from the first row 904 by a certain distance, which corresponds to a time offset between when it was driven to black. A third row 914, one down from the first row 904, would then be addressed black followed by a correctly addressed fourth row 912 located directly below the second row 902, and so on.

This double scrolling of addressed lines allows an optimal period between the addressing of any one line within a frame update cycle while preserving adequate time for line addressing. This distinguishes it from black-frame insertion where alternate frames are driven to black with a conventional single scrolling line addressing scheme because the time between successive addressing is a frame period, which in general is non-optimal. In contrast, double line scrolled addressing may slightly alter the row shift register architecture allowing two passed 'tokens' to coexist and trigger alternately.

It is also possible to alter the panel electronics to further compliment dual line addressing. One option includes introducing split column electrodes where data can be applied simultaneously to the top and bottom half of the display. This doubles the addressing frame rate for any given line address time. It is particularly suitable when paired addressed lines are separated by at least half the display height. Another option reduces the line address time for driving to black by increasing the current drive capability of the column data lines. This can be achieved by reducing column electrode resistance and driver output impedance. Yet another approach could be to introduce an extra reset connection to all pixels for each row.

The scrolling nature of these embodiments may use a scrolling segmented PCP 920. Furthermore, any residual crosstalk can be reduced using a scrolling back light 930 as introduced previously.

Figure 10:
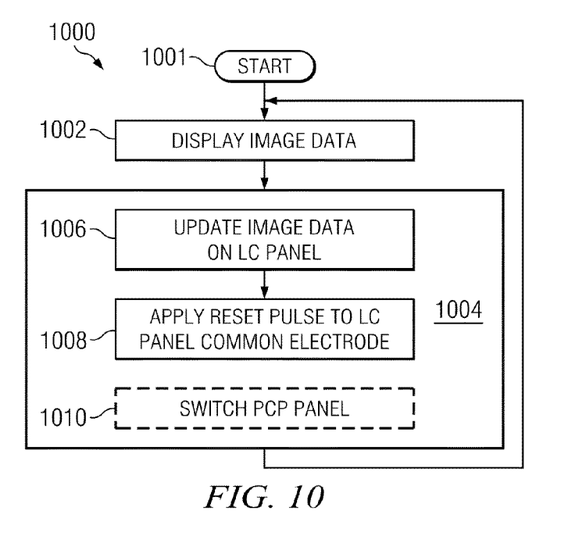
FIG. 10 is a flow diagram illustrating a process of crosstalk suppression in a time sequential LCD system, in accordance with the present disclosure.

FIG. 10 is a flow diagram illustrating a process 1000 of crosstalk suppression in a time sequential LCD system. The process 1000 starts at action 1001. Image data is displayed at action 1002. For example, first eye image data may be displayed at action 1002.

After image data is displayed at 1002, light is stopped from reaching a viewer at action 1004. In an embodiment, during action 1004, a back-light is turned off to stop light from reaching a viewer. In another embodiment, during action 1004, light is blocked by synchronizing with a viewer's shutter glasses.

Also during action 1004, image data on the LC panel is updated at action 1006. For example, second eye image data may be written to the LC panel at action 1006. In an embodiment, data is written sequentially from a first line to a last line of an LC panel. For example, data may be written sequentially from a top line to a bottom line of an LC panel. In some embodiments, data is written by applying voltages to bottom electrodes corresponding to pixels associated with the lines of the LC panel.

Also during action 1004, and substantially after action 1006, a reset pulse is applied to an LC panel common electrode at action 1008. In an embodiment, at action 1008, the pixels of the LC are driven to a common state (e.g., a common black state), enabling them to globally relax into the desired written state without mixing imagery with the previously written image and while suppressing unwanted intensity reversal. In some embodiments, a reset pulse is applied to a top electrode on the LC panel.

Optionally during action 1004, a polarization control panel (PCP) is switched or transitioned between polarization modes at action 1010. For example, in an embodiment in which a PCP and passive analyzers are used, the PCP may be switched at some point during action 1004.

Substantially after a reset pulse is applied at action 1008, light is provided or allowed to a viewer of the LC display at action 1002. The top electrode is returned to a common voltage level. The image data is displayed at action 1002. In an embodiment, light is allowed by turning on a back light of the LC display. In another embodiment, light is allowed to the viewer by synchronizing shutter glasses of the viewer with the LC display at action 1002, allowing a viewer to view the image data.

Figure 11:
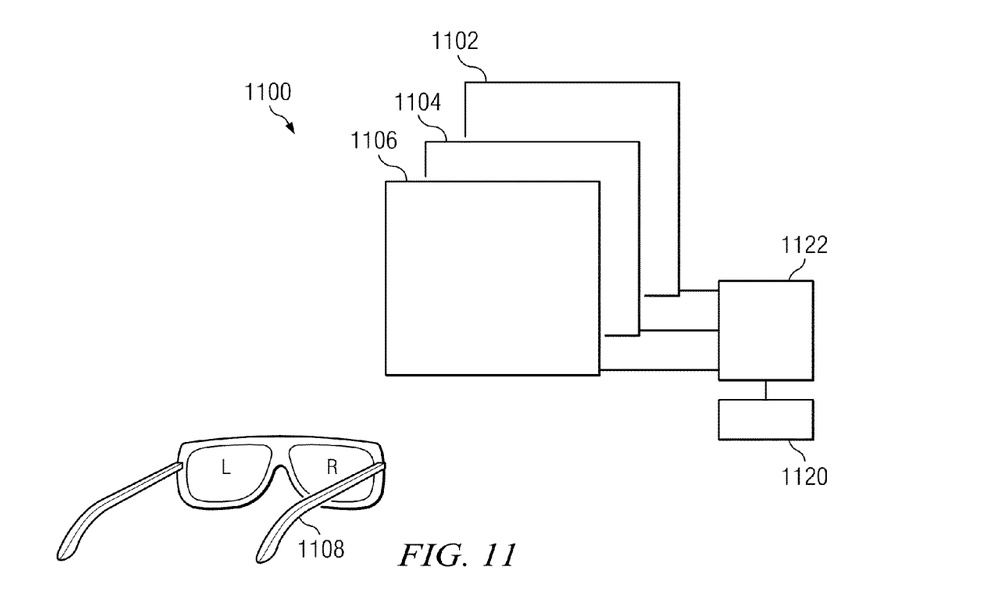
FIG. 11 is a schematic diagram illustrating a system for crosstalk suppression in a stereoscopic LCD system, in accordance with the present disclosure.

FIG. 11 is a schematic conceptual diagram illustrating an exemplary stereoscopic flat panel display system 1100. The system 1100 may include a backlight 1102, an LC modulation panel 1104, and a polarization control panel 1106. The system 1100 may also include a controller 1122 providing control interfaces for controlling the backlight 1102, LC panel 1104, and PCP 1106.

For example, a backlight interface may provide a backlight control signal to a backlight 1102, allowing for the backlight to be synchronized with the LC panel 1104 and with the PCP 1106. An LC interface may provide an LC control signal to the LC panel 1104, allowing for the LC panel to be synchronized with the backlight 1102 and with the PCP 1106. A PCP interface may provide a PCP control signal to the PCP 1106, allowing for the PCP to be synchronized with the backlight 1102 and with the PCP 1106.

The controller 1122 may be in communication with a source 1120. The source 1120 may include a DVD player, cable signal, internet signal, or any other signal capable of providing image data to the system 1100.

The system 1100, and other similar systems, may be used to employ the methods taught in the present disclosure. As discussed above, some embodiments may not include a PCP. Some embodiments may use an always-on backlight and synchronize with shutter glasses, resulting in light being stopped or allowed from reaching a viewer. Accordingly, all three components in FIG. 11 may not be used and/or synchronized in each embodiment of the disclosure. FIG. 11 is merely an exemplary system for certain disclosed embodiments and alternate arrangements and permutations to the system 1100 are understood.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for crosstalk suppression in a time sequential liquid crystal stereoscopic display system, comprising:
    after displaying a first eye image, stopping light to a viewer for a dark period;
    during the dark period:
        writing data sequentially on a liquid crystal (LC) panel, and
        applying a reset pulse to an electrode on the LC panel after the last line is written; and
    allowing light to the viewer after the reset pulse is applied, for a viewing period.

2. The method of claim 1, wherein writing data sequentially comprises writing data sequentially from top to bottom lines of the LC panel.

3. The method of claim 1, wherein writing data comprises applying voltages to bottom electrodes corresponding to pixels of the LC panel, and wherein applying the reset pulse comprises applying the reset pulse to a top electrode on the LC panel.

4. The method of claim 1, further comprising, during the dark period, globally resetting substantially all pixels in the LC panel to a common LC state.

5. The method of claim 4, wherein the common LC state comprises a common dark state.

6. The method of claim 1, further comprising displaying a second eye image.

7. The method of claim 1, further comprising returning the top electrode to a common voltage level.

8. The method of claim 1, further comprising, during the dark period, switching a polarization converting panel between a first-eye and a second-eye polarization mode.

9. A method for crosstalk suppression in a time sequential liquid crystal stereoscopic display system, comprising:
    after displaying a first eye image, turning off a backlight for a dark period;
    during the dark period:
        writing data sequentially on a liquid crystal (LC) panel, and
        applying a reset pulse to an electrode on the LC panel just after the last line is written; and
    turning on the backlight just after the reset pulse is applied, for a viewing period.

10. The method of claim 9, wherein writing data sequentially comprises writing data sequentially from top to bottom lines of the LC panel, and wherein writing data further comprises applying voltages to bottom electrodes corresponding to pixels of the LC panel, and wherein applying the reset pulse comprises applying the reset pulse to a top electrode on the LC panel.

11. The method of claim 9, further comprising, during the dark period, globally resetting substantially all pixels in the LC panel to a common LC state.

12. The method of claim 11, wherein the common LC state comprises a common dark state.

13. The method of claim 9, further comprising displaying a second eye image.

14. The method of claim 9, further comprising returning the top electrode to a common voltage level.

15. The method of claim 9, further comprising, during the dark period, switching a polarization converting panel between a first-eye and a second-eye polarization mode.

16. A method for crosstalk suppression in a time sequential liquid crystal stereoscopic display system, comprising:
    after displaying a first eye image, blocking light by synchronizing the display system with shutter glasses blocking light from reaching a viewer for a dark period;
    during the dark period:
        writing data sequentially on a liquid crystal (LC) panel, and
        applying a reset pulse to an electrode on the LC panel just after the last line is written; and
    allowing light by synchronizing the display system with the shutter glasses allowing light to reach the viewer just after the reset pulse is applied, for a viewing period.

17. The method of claim 16, wherein writing data sequentially comprises writing data sequentially from top to bottom lines of the LC panel, and wherein writing data further comprises applying voltages to bottom electrodes corresponding to pixels associated with the lines of the LC panel, and wherein applying the reset pulse comprises applying the reset pulse to a top electrode on the LC panel.

18. The method of claim 16, further comprising, during the dark period, globally resetting substantially all pixels in the LC panel to a common LC state.

19. The method of claim 18, wherein the common LC state comprises a common dark state.

20. The method of claim 16, further comprising returning the top electrode to a common voltage level to display a second eye image.

* * * * *